US010452949B2

United States Patent
Jia et al.

(10) Patent No.: US 10,452,949 B2
(45) Date of Patent: Oct. 22, 2019

(54) SYSTEM AND METHOD FOR SCORING CLUTTER FOR USE IN 3D POINT CLOUD MATCHING IN A VISION SYSTEM

(71) Applicant: Cognex Corporation, Natick, MA (US)

(72) Inventors: Hongjun Jia, Hopkinton, MA (US); David J. Michael, Wayland, MA (US); Adam Wagman, Stow, MA (US); Andrew Hoelscher, Cambridge, MA (US)

(73) Assignee: Cognex Corporation, Natick, MA (US)

( * ) Notice: Subject to any disclaimer, the term of this patent is extended or adjusted under 35 U.S.C. 154(b) by 3 days.

(21) Appl. No.: 14/938,981

(22) Filed: Nov. 12, 2015

(65) Prior Publication Data

US 2017/0140537 A1    May 18, 2017

(51) Int. Cl.
*G06K 9/00*    (2006.01)
*G06K 9/62*    (2006.01)
(Continued)

(52) U.S. Cl.
CPC .............. *G06K 9/6201* (2013.01); *G06T 7/20* (2013.01); *G06T 7/30* (2017.01); *G06T 7/344* (2017.01);
(Continued)

(58) Field of Classification Search
CPC ......... G06K 9/6201; G06T 7/30; G06T 7/344; G06T 7/20; G06T 2207/10028; H04N 13/204
(Continued)

(56) References Cited

U.S. PATENT DOCUMENTS 5,109,425  A    4/1992  Lawton
6,173,070  B1   1/2001  Michael et al.
(Continued)

FOREIGN PATENT DOCUMENTS

JP    2009531784 A    9/2009
JP    2011165007 A    8/2011
(Continued)

OTHER PUBLICATIONS

Sobel, et al., "Automated Identification and Classification of Land Vehicles in 3D Ladar Data", "Automatic Target Recognition XIV", Sep. 21, 2004, pp. 92-101, vol. 5426, Publisher: International Society for Optical Engineering. Proceedings, Published in: US.
(Continued)

*Primary Examiner* — Aaron W Carter
(74) *Attorney, Agent, or Firm* — Loginov & Associates

(57) ABSTRACT

This invention provides a system and method for aligning first three-dimensional (3D) point cloud image representing a model with a second 3D point cloud image representing a target, using a vision system processor. A passing overall score is established for possible alignments of the first 3D point cloud image with the second 3D point cloud image. A coverage score for at least one alignment of the first 3D point cloud image with the second 3D point cloud image is estimated so that the coverage score describes an amount of desired features in the first 3D point cloud image present in the second 3D point cloud image. A clutter score is estimated so that the clutter score describes extraneous features in the second 3D point cloud image. An overall score is computed as a difference between the coverage score and the clutter score.

21 Claims, 4 Drawing Sheets

(51) Int. Cl.
  *H04N 13/204* (2018.01)
  *G06T 7/30* (2017.01)
  *G06T 7/20* (2017.01)
  *G06T 7/33* (2017.01)

(52) U.S. Cl.
  CPC . *H04N 13/204* (2018.05); *G06T 2207/10028* (2013.01)

(58) Field of Classification Search
  USPC ....... 382/154, 151, 110, 106, 287, 294, 128, 382/190; 348/118, E7.085; 345/419, 345/422, 580, 619, 629, 420, 421, 427; 701/23, 28; 726/19; 705/7.29, 7.31, 7.33
  See application file for complete search history.

(56) References Cited

U.S. PATENT DOCUMENTS

| | | | |
|---|---|---|---|
| 6,323,776 | B1 | 11/2001 | Jackson et al. |
| 6,476,803 | B1 | 11/2002 | Zhang et al. |
| 6,941,026 | B1 | 9/2005 | Nadabar et al. |
| 7,110,602 | B2 | 9/2006 | Krause |
| 7,995,054 | B2 | 8/2011 | Wheeler et al. |
| 8,054,217 | B2 | 11/2011 | Bruyere et al. |
| 8,179,393 | B2 * | 5/2012 | Minear ................. G06T 7/0024 345/419 |
| 8,260,059 | B2 | 9/2012 | Hofhauser et al. |
| 8,269,830 | B1 | 9/2012 | Delaney |
| 8,290,305 | B2 * | 10/2012 | Minear ................. G06T 7/0026 345/629 |
| 8,345,930 | B2 * | 1/2013 | Tamrakar ............. G06T 7/0002 382/110 |
| 8,442,304 | B2 | 5/2013 | Marrion et al. |
| 8,447,099 | B2 | 5/2013 | Wang et al. |
| 8,488,877 | B1 | 7/2013 | Owechko et al. |
| 8,675,951 | B2 * | 3/2014 | van den Hengel ... G06T 7/0071 345/420 |
| 8,686,992 | B1 * | 4/2014 | Makadia ............ G06K 9/00214 345/419 |
| 8,995,756 | B2 * | 3/2015 | Lee .................... G06K 9/00214 382/103 |
| 9,193,355 | B2 * | 11/2015 | Ferguson .............. B60W 30/00 |
| 9,294,495 | B1 * | 3/2016 | Francoeur ........... H04L 63/1433 |
| 9,355,462 | B2 * | 5/2016 | Chen .................... G06T 7/2033 |
| 2006/0088202 | A1 | 4/2006 | Venkatachalam |
| 2008/0181487 | A1 | 7/2008 | Hsu et al. |
| 2009/0232388 | A1 | 9/2009 | Minear et al. |
| 2010/0166294 | A1 * | 7/2010 | Marrion ............. G06K 9/00214 382/154 |
| 2013/0293532 | A1 | 11/2013 | Vaddadi et al. |
| 2014/0050387 | A1 | 2/2014 | Zadeh |
| 2014/0120319 | A1 | 5/2014 | Joseph |
| 2014/0192050 | A1 | 7/2014 | Qiu et al. |
| 2015/0003723 | A1 | 1/2015 | Huang et al. |
| 2015/0006126 | A1 | 1/2015 | Taguchi et al. |
| 2015/0063683 | A1 | 3/2015 | Fu |
| 2015/0242697 | A1 * | 8/2015 | Guo ...................... G06T 7/0014 382/128 |
| 2016/0042516 | A1 * | 2/2016 | Tieu ................... G06K 9/00013 382/124 |
| 2016/0094801 | A1 * | 3/2016 | Beysserie ................ H04N 5/91 386/226 |
| 2016/0148437 | A1 * | 5/2016 | Vlutters ................. G06T 7/344 382/128 |
| 2016/0155017 | A1 * | 6/2016 | Vlutters ................ A61M 16/06 382/128 |
| 2016/0364878 | A1 * | 12/2016 | Guo ...................... G06T 7/0081 |
| 2017/0140537 | A1 * | 5/2017 | Jia ........................ G06K 9/6201 |
| 2018/0130224 | A1 * | 5/2018 | Hoelscher ................ G06T 7/70 |
| 2018/0130234 | A1 * | 5/2018 | Barker ................ H04N 13/204 |
| 2019/0122363 | A1 * | 4/2019 | Greveson ............. G06T 7/0014 |

FOREIGN PATENT DOCUMENTS

| | | |
|---|---|---|
| JP | 2011221988 A | 11/2011 |
| JP | 2012032370 A | 2/2012 |
| JP | 2012514252 A | 6/2012 |
| JP | 2012150796 A | 8/2012 |
| JP | 2015007639 A | 1/2015 |
| WO | 1997040342 | 10/1997 |
| WO | 2010042466 A1 | 4/2010 |
| WO | 2012146253 A1 | 11/2012 |
| WO | 2015002114 A1 | 1/2015 |

OTHER PUBLICATIONS

Drost, et al., "Model Globally, Match Locally: Efficient and Robust 3D Object Recognition", "Conference on Computer Vision and Patern Recognition", Jun. 13, 2010, pp. 998-1005, Publisher: IEEE, Published in: US.

Stevens, et al., "Parameter Adaptaion for Target Recognition in Ladar", "Automatic Target Recognition XV", May 19, 2005, p. 201, vol. 5807, Publisher: International Society for Optical Engineering. Proceedings, Published in: US.

* cited by examiner

SYSTEM AND METHOD FOR SCORING CLUTTER FOR USE IN 3D POINT CLOUD MATCHING IN A VISION SYSTEM

FIELD OF THE INVENTION

This invention relates to machine vision systems and associated methods for alignment and inspection of objects in an imaged scene.

BACKGROUND OF THE INVENTION

Machine vision systems, also termed "vision systems" herein, are used to perform a variety of tasks in a manufacturing environment. In general, a vision system consists of one or more two-dimensional (2D) cameras with an image sensor (or "imager") that acquires grayscale or color images of a scene that contains an object under manufacture. 2D images of the object can be analyzed to provide data/information to users and associated manufacturing processes. The data produced by the 2D camera is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well-known PatMax® system commercially available from Cognex Corporation of Natick, Mass., compare features in a 2D image of a scene to a trained (using an actual or synthetic model) 2D pattern, and determine the presence/absence and pose of the 2D pattern in the 2D imaged scene. This information can be used in subsequent inspection (or other) operations to search for defects and/or perform other operations, such as part rejection.

A particular task employing vision systems is the alignment of a three-dimensional (3D) target shape during runtime based upon a trained 3D model shape. 3D cameras can be based on a variety of technologies—for example, a laser displacement sensor (profiler), a stereoscopic camera, a sonar, laser or LIDAR range-finding camera, and a variety of other passive or active range-sensing technologies. Such cameras produce a range image wherein an array of image pixels (typically characterized as positions along orthogonal x and y axes) is produced that also contain a third (height) dimension for each pixel (typically characterized along a z axis perpendicular to the x-y plane). Alternatively, such cameras can generate a point cloud representation of an imaged object. A point cloud is a collection of 3D points in space where each point i can be represented as $(X_i, Y_i, Z_i)$. A point cloud can represent a complete 3D object including the object's back and sides, top and bottom. 3D points $(X_i, Y_i, Z_i)$ represent locations in space where the object is visible to the camera. In this representation, empty space is represented by the absence of points.

By way of comparison, a 3D range image representation $Z(x, y)$ is analogous to a 2D image representation $I(x, y)$ where the depth or height Z replaces what would be the brightness/intensity I at a location x, y in an image. A range image exclusively represents the front face of an object that is directly facing a camera, because only a single depth is associated with any point location x, y. The range image typically cannot represent an object's back or sides, top or bottom. A range image typically has data at every location (x, y) even if the camera is free of information at such locations. Sometimes, the camera image data directly represents that no information is present by including "missing pixel" labels at certain locations. A "missing pixel" could mean that the imaging conditions were poor at the location in the image, or it could mean that a hole is present at that location in the object. 3D range images can sometimes be processed with conventional 2D image processing techniques where the height dimension Z is substituted for brightness/intensity I, and missing pixels are handled in a special way or they are ignored.

By way of further background, converting 3D images between range image representations and 3D point cloud representations of 3D can be accomplished by appropriate techniques, but not without loss of information and/or loss of accuracy. Some 3D cameras can directly produce either 3D point cloud images OR 3D range images at the time the images are acquired (concurrently). Even converting images between representations from cameras that are able to produce either representation can cause loss of accuracy once the images are acquired. Thus, a 3D point cloud or range image is most accurate when is acquired by the camera in that respective mode.

In aligning a target image (either acquired or generated by a synthetic process) to a model image (also either acquired or synthetic) one approach involves the matching/comparison of a 3D point cloud in the target to one in the model in an effort to find the best matching pose. The comparison can involve a scoring of the coverage of the target with respect to the model. A score above a certain threshold is considered an acceptable match/pose-estimation, and this information is used to generate an alignment result. It is nevertheless challenging to accurately and efficiently generate an alignment result based upon 3D images, and practical, generalized techniques that employ matching of model and target 3D point clouds are generally unavailable.

SUMMARY OF THE INVENTION

This invention overcomes disadvantages of the prior art by providing a system and method for aligning 3D target images with 3D model images using clutter in the 3D (point cloud) images, thus providing a generalized technique for 3D matching that operates on a variety of surface shapes. Clutter is identified in the target image, representing elements that are not expected to be in the image, and is used to calculate a clutter score, which is used to match alignment candidates from various poses. If too much clutter is observed in the 3D image, then a match is not suggested. That pose, thus inversely affects the score, and such a pose is rejected as a candidate. Those scores that meet a predetermined threshold are, conversely, considered pose candidates that can be used to generate an alignment result.

In an illustrative embodiment a system and method for aligning first 3D point cloud image with a second 3D point cloud image using a vision system processor is provided, which includes a first 3D point cloud image (typically an image of a of a source object—termed a "model") and a second 3D point cloud image (typically an image of a runtime object—termed a "target"). A passing overall score is established for possible alignments of the first 3D point cloud image with the second 3D point cloud image. A coverage score for at least one possible alignment of the first 3D point cloud image with the second 3D point cloud image is estimated so that the coverage score describes an amount of desired features in the first 3D point cloud image present in the second 3D point cloud image. A clutter score is also estimated for at least one possible alignment of the first 3D point cloud image with the second 3D point cloud image so that the clutter score describes extraneous features in the second 3D point cloud image. An overall score is computed as a difference between the coverage score and the clutter score. Illustratively, the model is defined using at least one of a 3D camera and a 3D computer aided design description, and the target is defined using at least one of a 3D camera and a 3D computer aided design description. The system and method illustratively defines a bounding volume around the first 3D point cloud image to calculate the coverage score and the clutter score. This bounding volume can be defined automatically or based on a user-specified definition. The volume can, for example, define a cuboidal shape with rectilinear sides, or any other desirable shape. In embodiments (under certain criteria) it can be axis-aligned and/or set to a minimum volume to enclose/demarcate (contain) the 3D point cloud image. As an initial step the first 3D point cloud image and the second 3D point cloud image are roughly registered based upon matching of a predetermined arrangements of points in each of the first 3D point cloud image and the second 3D point cloud image. Illustratively each point in the first 3D point cloud image and the second 3D point cloud image can define a coverage weight used in the score computation, in which the coverage weight can be defined between a value of 0 and a value of 1. Additionally, the overall score can be estimated based upon the clutter score multiplied by a clutter rate constant. The clutter rate constant can be set by the user (e.g.) using a GUI and can be a value of 1 or less (e.g. 0.5).

BRIEF DESCRIPTION OF THE DRAWINGS

The invention description below refers to the accompanying drawings, of which.

DETAILED DESCRIPTION

Figure 1:
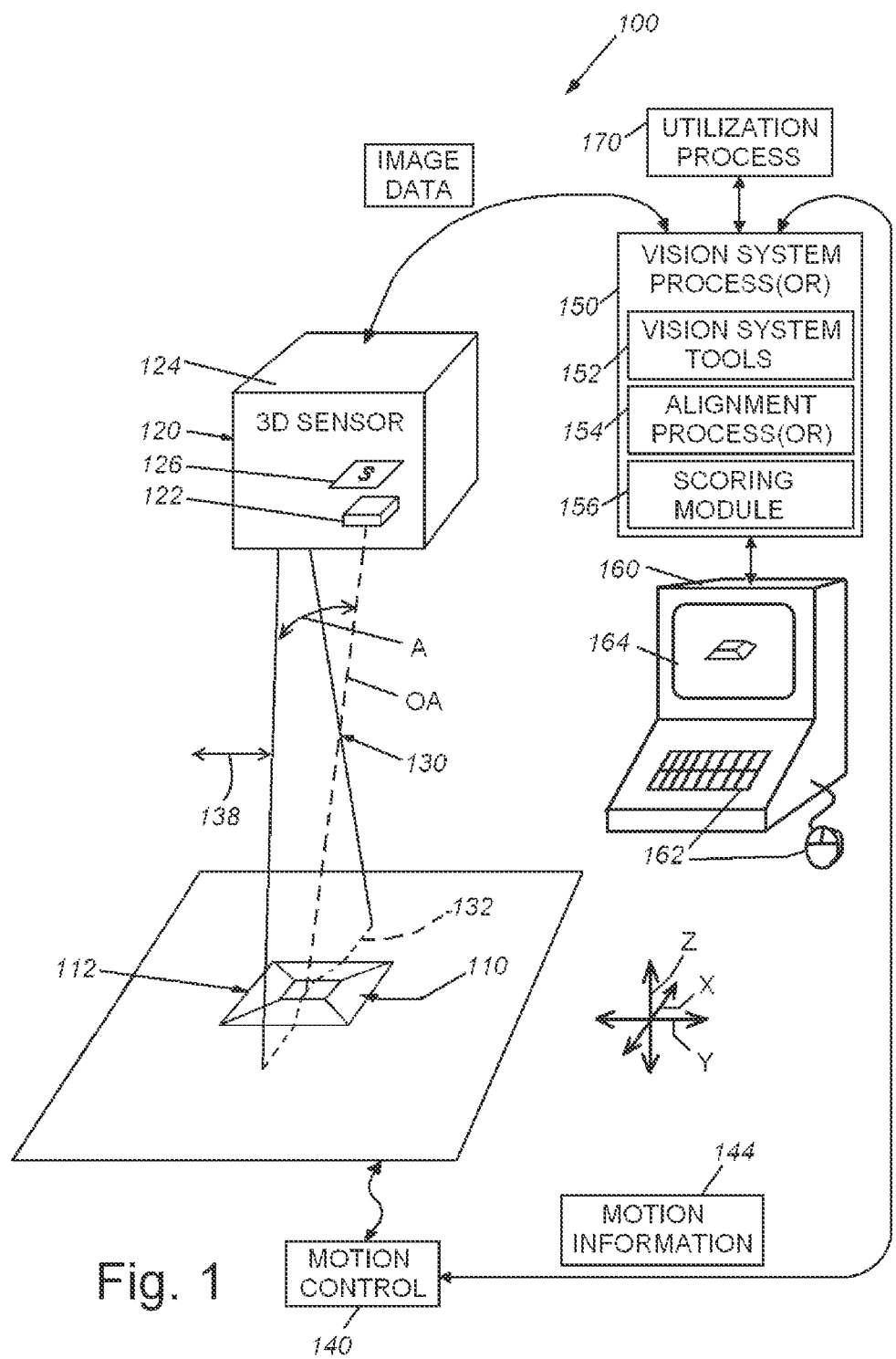
FIG. 1 is a diagram of a vision system arranged to acquire a 3D (point cloud) image of a surface of an object (an exemplary frustum) for purposes of alignment.

FIG. 1 shows a machine vision system arrangement (also termed herein, a "vision system") 100 for use in inspecting and/or analyzing features on the surface 110 of an object 112 that is imaged within the field of view (FOV) of a 3D vision system camera assembly 120, also termed a "displacement sensor". The camera assembly 120 can be any acceptable arrangement of components and typically includes a lens assembly 122 and a camera body 124 that houses an image sensor (or "imager") 126, based upon any acceptable imaging technology, such as CCD or CMOS. The imager 126 can be arranged to acquire images in one or two dimensions (e.g. along the x and y axes) in an array of image pixels that can be adapted to sense the scene in either grayscale or color. The camera assembly 120 is further adapted to determine a third orthogonal dimension (e.g. height along the z axis) that constitutes a 3D "range image" of the object surface 110. A variety of technologies can be employed to generate height data for respective image pixels. The height data and its associated range image is converted to a point cloud. Alternatively, the 3D vision system camera assembly can directly acquire the collection of 3D points (point cloud) using appropriate camera functionalities and settings. Note that a plurality of cameras and/or sensors can be employed in an array and the term 3D camera assembly is used to describe the overall arrangement for generating a point cloud representation of the object surface.

An exemplary type of 3D camera assembly employed to generate a point cloud (as depicted in FIG. 1) is a laser displacement sensor, which projects a fan 130 of laser light (or another structured illumination) at the object surface 110 to form a line (e.g. oriented across the x direction) 132, and receives reflected light at the laser displacement sensor's imager 126 from the projected line at a relative (acute) angle (A) between the plane of the fan 130 and imager optical axis OA. The projected line 132, thus, appears in the imager's pixel array 126 as a displacement along the y-direction, across the x-direction based upon the height of the object surface at each point. This y-based displacement is translated by the camera assembly into a height value along the z axis. A detected point's corresponding x-coordinate in space is $X_i$. The corresponding height value for that detected point is $Z_i$. Obtaining a value for $Y_i$ is discussed below.

In a typical arrangement, the 3D camera assembly 120 and/or object 112 are in relative motion (e.g. in the physical y-coordinate direction depicted by arrow 138) so that the object surface 110 is scanned by the laser displacement sensor(s), and a sequence of images are acquired of the laser line 130 at desired spatial intervals—typically in association with a motion controller 140 and associated encoder or other motion-measurement device (or, alternatively, at time based intervals) that delivers motion information 144 to the system vision processor (150, described below). The position of a point on the object along the motion direction is defined as coordinate Yi. The collection of points (Xi,Yi,Zi) acquired by the 3D camera assembly is defined as the point cloud.

It is expressly contemplated that 3D camera assemblies, operating using other functional principles, can also be employed to capture a 3D image (range image or point cloud) of an object in a scene. For example, structured light systems, stereo vision systems, DLP metrology, and other arrangements can be employed. These systems all generate an image that provides a height value (e.g. z-coordinate) to pixels.

A 3D point cloud image generated by various types of 3D camera assemblies (or combinations thereof) can be used to locate and determine the presence and/or characteristics of particular features on the object surface.

The camera body 124 can contain various image processing components that constitute a vision processor 130 that operates an associated vision process. The vision processor 150 operates upon the acquired images of the scene and can employ vision system tools and processes 152 to extract information from the acquired image. This information can relate to features of interest and other items appearing within the image—for example vision system tools such as the well-known PatMax®, available from Cognex Corporation of Natick, Mass., can be used to analyze 2D and 3D features in the image and provide information on relative pose, alignment and other details—e.g. edges, blobs, etc. While some or all of the vision system processes can be instantiated within the body 124 of the camera assembly 120. It is expressly contemplated that some or all of the processes can be carried out by an interconnected (wired or wireless) computing device/processor 160, such as a purpose-built processor or a general purpose computer (e.g. server, PC, laptop, smartphone, tablet, etc.), with appropriate user interface 162 and display 164. The interconnected computing device/processor 160 can employ the processed image data to carry out further utilization tasks (i.e. using a "utilization element(s)" or "utilizer" process(es)) 170. For example, where the vision system carries out inspection tasks, the information can be used to provide quality control information to a database or to reject defective parts on a line. The information can also be used (e.g.) in logistics applications, by reading labels and/or ID codes on objects. A variety of other utilization tasks can also be undertaken with image data and associated information.

In the illustrative embodiment, the vision process and processor includes an alignment process(or) 154 that employs a clutter determination process(or) to facilitate alignment of a model and target 3D image. The alignment process(or) 154 operates to determine a level of clutter in an acquired image according to embodiments herein. Clutter is generally considered information in an image where, according to the trained pattern in the image, none should exist. In general, most conventional search tools look for the presence of a trained pattern, and if found, return a result that indicates success. However, in the case of clutter or other undesired "noise" in an image of an object surface, the desired/trained pattern may exist, but the overall image still indicates a defect (due to the additional noise or clutter) that would cause a user to reject the object as defective.

In determining alignment, the process(or) 150 employs a clutter scoring process shown as a scoring module 156 that generates clutter scores associated with each pose of the image data (described below). In combination with a coverage score generated between the model and target images for each possible pose, the alignment process(or) determines a best alignment for the target with respect to the model.

Figure 2:
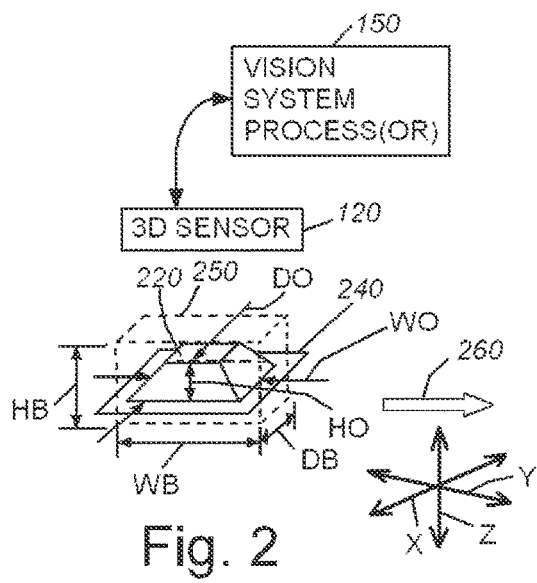
FIG. 2 is a diagram showing a vision system in train time, arranged to define a 3D bounding volume of appropriate size around an exemplary model object (frustum) that is free of a clutter region.

Reference is now made to FIG. 2, which shows an exemplary model object (e.g. a frustum) 210 imaged by the above-described 3D vision system camera/sensor 120 and process(or) 150 during train time of the vision system. The image generated by the camera/sensor 120 can be defined as a 3D point cloud (model) image in that it consists of an collection of points with associated x and y and z coordinates, all associated with the coordinate space of the camera. The field of view 240 encompasses the entire object, which defines a maximum height Depth DO (along the depicted x axis), a maximum width WO (along the depicted y axis), and maximum height HO (along the depicted z axis). The vision system is arranged to define a 3D bounding volume 250 (a cuboid or "box" in this example with rectilinear/orthogonal, planar sides) around the object 220 with respective dimensions DB, WB and HB in a manner that encloses (demarcate) the full depth, width and height of the object. As described below the object is free of clutter features in this example and the size of the bounding volume is adapted to fully enclose the object. Note that the 3D camera/sensor in this embodiment operates based upon relative motion between the object and the sensor in a scanning direction (arrow 260).

Figure 3:
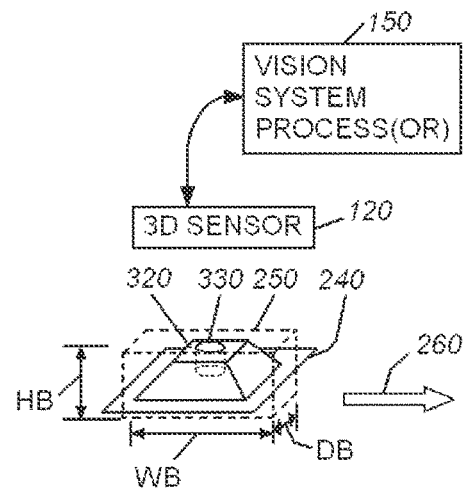
FIG. 3 is a diagram showing a vision system in runtime, with the trained 3D bounding volume of FIG. 2 located around an exemplary runtime object (frustum) that includes a clutter region recessed within a top of the object, such that the trained bounding volume is sized to include the clutter.

With reference now to FIG. 3, a similarly shaped, exemplary runtime object ("termed generally herein, the "target") 320 (frustum) is imaged by the vision system camera/sensor 120 (via scanning—arrow 260) for the purpose of aligning its 3D point cloud image with the model 3D point cloud image so as to determine the best pose. The bounding volume 250 defined at train time is now located by the vision system so that it fully encloses the image of target 320. In this example, the object 320 includes a clutter region in the form of an exemplary indentation or recess 330 in the top surface of the object. The selection of the bounding volume dimensions in train time allows this bounding volume 250 to fully encompass the features of the object 320, including the exemplary clutter region 330 when it is mapped to the image. As described further below, the definition of the bounding volume 250 is sufficient to allow most points on the surface of the recess to receive clutter weight values. These weight values are used as contributions to the overall clutter score of the particular pose of the imaged target.

Figure 4:
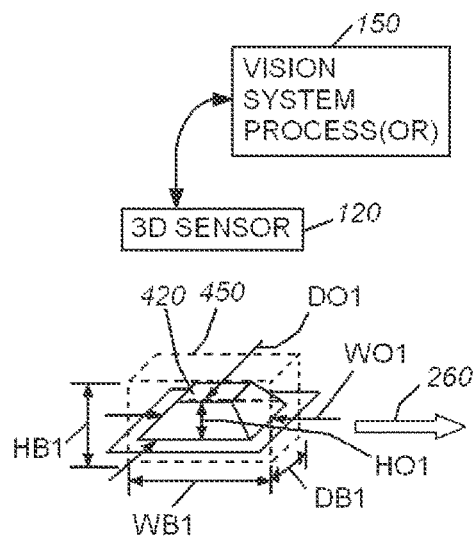
FIG. 4 is a diagram showing a vision system in train time, arranged to define a 3D bounding volume of appropriate size around an exemplary model object (frustum) that is free of a clutter region.
Figure 5:
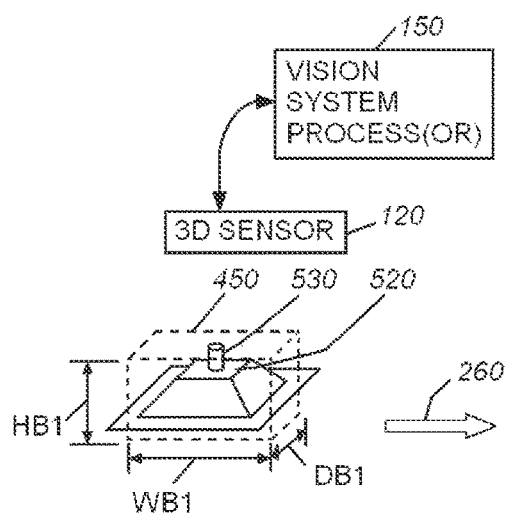
FIG. 5 is a diagram showing a vision system in runtime, with the trained 3D bounding volume of FIG. 4 located around an exemplary runtime object (frustum) that includes a clutter region projecting above a top of the object, such that the trained bounding volume is sized to include the clutter.

In FIG. 4, a similar training object (frustum) 420 is imaged by the camera/sensor 120 and associated vision process(or) 150. The system expects clutter that may exceed at least one of the object's standard maximum dimensions DO1, WO1 and HO1 (in this case the height HO1), and thus, the 3D bounding volume 450 dimensions DB1, WB1 and HB1 are expanded (in this case the volume height HB1) to encompass the anticipated excess height that is brought about by the clutter region. This less-tight bounding volume is then applied in runtime in FIG. 5 to the pose of the imaged target 520. In this case, a projection 530 provides a clutter region that the expanded bounding volume 450 includes within its boundaries when mapped to the image. This ensures that the projection (clutter) 530 is included in the clutter weight values and becomes part of the overall clutter score computation. In various embodiments, the bounding volume defines a top and a bottom plane (e.g. within a cuboid shape) that are each parallel to a base plane and the volume is retained to rotation exclusively about the z axis.

Figure 6:
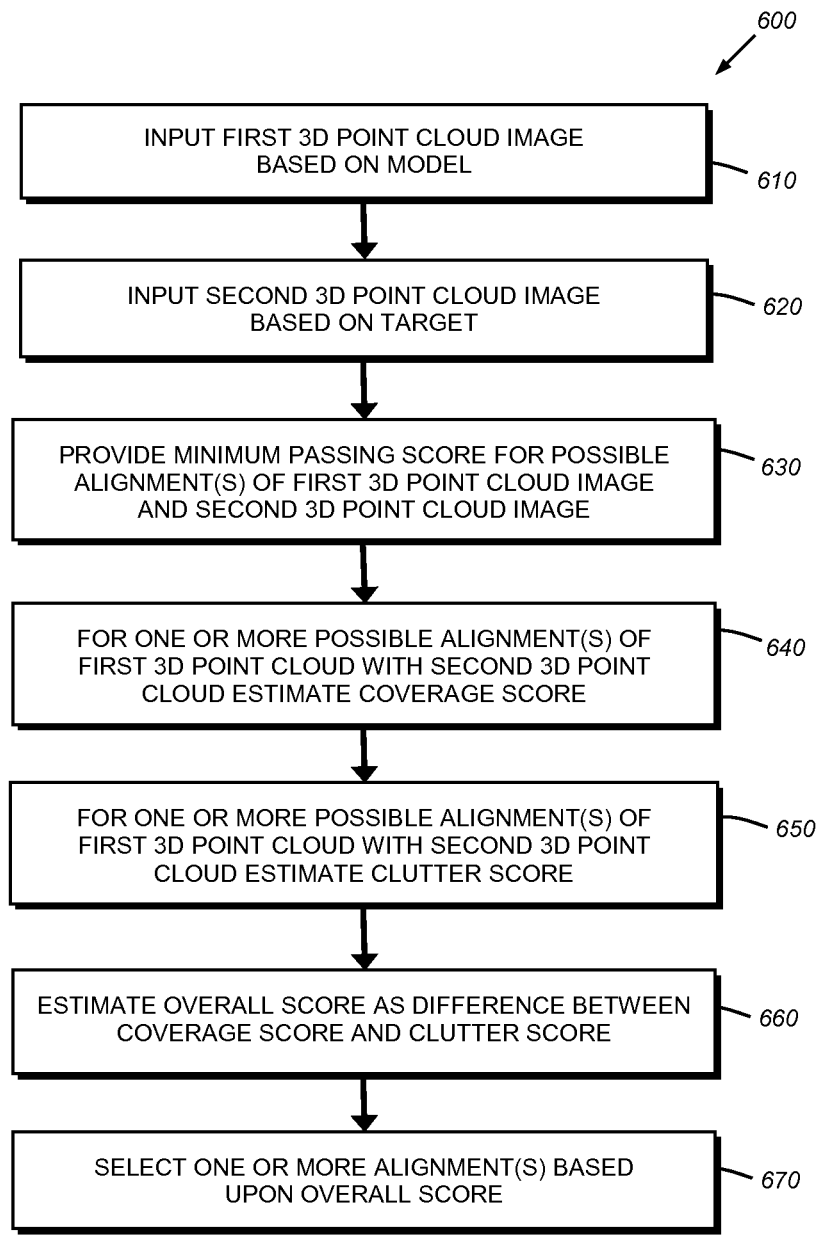
FIG. 6 is a flow diagram of a procedure for aligning a model 3D point cloud image with a target 3D point cloud image using estimated coverage score and clutter score.

With reference now to FIG. 6, a procedure 600 for aligning a model 3D point cloud image with a target 3D point cloud image using estimated coverage score and clutter score to choose an alignment candidate that represents the best pose. In step 610, a first 3D point cloud image is input to the vision system alignment process(or) (154 in FIG. 1) based on the above-described model of the object. In step 620, a second 3D point cloud image is also input to the alignment process(or) 154 based on the target. The user or an automated system provides a minimum passing score for possible alignments between the model 3D point cloud image and the target 3D point cloud image in step 630. This can entail setting a value in the system GUI at setup/training time or providing the value during runtime.

Next, in step 640, for one or more possible alignment(s) between the model 3D point cloud and the target 3D point cloud, the process 600 estimates respective coverage scores. In step 650, the process 600 then estimates the clutter score for one or more possible alignment(s) between the model 3D point cloud and the target 3D point cloud. Note that the illustrative system and method selects the best alignment candidate based upon the overall coverage and clutter condition after aligning two 3D point clouds. The resulting pose is applied to the runtime clouds (the target) to align it with the train-time cloud (the model). Then, two scores are calculated from two aligned clouds, the coverage score and the clutter score.

Coverage score is denoted as the ratio between the sum of coverage score of all points on model and the number of all model points, while the clutter score is defined as the ratio between the sum of clutter score of all target points and the number of all model points. A model point is considered to be covered by the aligned target cloud if any mapped target point is within the neighborhood of this point and its coverage score is set to 1, otherwise 0. A target point is considered to be cluttered if it can be mapped to a location within or near the model cloud area while there are no actual model points nearby (the region is substantially free of model points), and its clutter score is 1; otherwise, the clutter score is 0. Illustratively, the coverage score describes how much the desired features on the model are covered by the target, and the clutter score describes the degree to which extraneous features are introduced into the model space from the target cloud. Optionally, a weight between 0 and 1 can also be introduced to each target/model point to further emphasize the importance of some points and provide an alternative to the above-described coverage/clutter score.

In an illustrative embodiment, the final estimated score is defined in accordance with step 660 of the process 600 as:

Score=Coverage score−Clutter score*Clutter rate.

The clutter rate is a constant to control the penalty of clutter score, which is between zero and one—e.g. it can be set to ½ (0.5), but can vary based upon a variety of other factors, and can be defined using (e.g.) the GUI described above. Illustratively, the score is set to 0 if the above equation yields a negative value. Alternatively, the process can be arranged to transfer the model and target 3D point clouds into 3D volumes or meshes, and use the volume or surface area of the overlapping region(s) to calculate the coverage and clutter score. If the point clouds have more attributes defined on each point, the above score can be computed based on attribute similarities in addition to distance. Note that each point in the model 3D point cloud has a computed "coverage weight", and each point in the target point 3D cloud has a computed "coverage weight" and a computed "clutter weight". All such weights are defined in the range [0, 1]. The coverage score is the ratio of the sums of the model coverage weights to the number of model points. Similarly, the clutter score is the ratio of the sums of the clutter weights to the number of model points.

The coverage weight and clutter weight for a runtime point are each computed based on the distance from its nearest mapped model point. If this distance is close enough (e.g., less than a threshold value dist_thres1), the coverage weight equals 1, and the coverage weight value decreases as the distance increases. Thus, if this distance is sufficiently far (e.g., more than the threshold value dist_thres2), the clutter weight is 1, and the clutter weight gets smaller as the distance becomes smaller. The coverage weights for the model points are based on the coverage weights of the runtime points. Illustratively, the coverage weight of a model point is equal to the maximum of the coverage weight of the runtime points that corresponded to it. Stated in terms of the following relationships where T is a transform to map from the model space to the target space:

mappedBox←$T$*boundingBox mappedModel←$T$*modelCloud $N_{model}$←the number of model points $W_{cover}$←the sum of coverage weights on all model points. A model point is "covered" if it is near a point in mappedBox.

Figure 7:
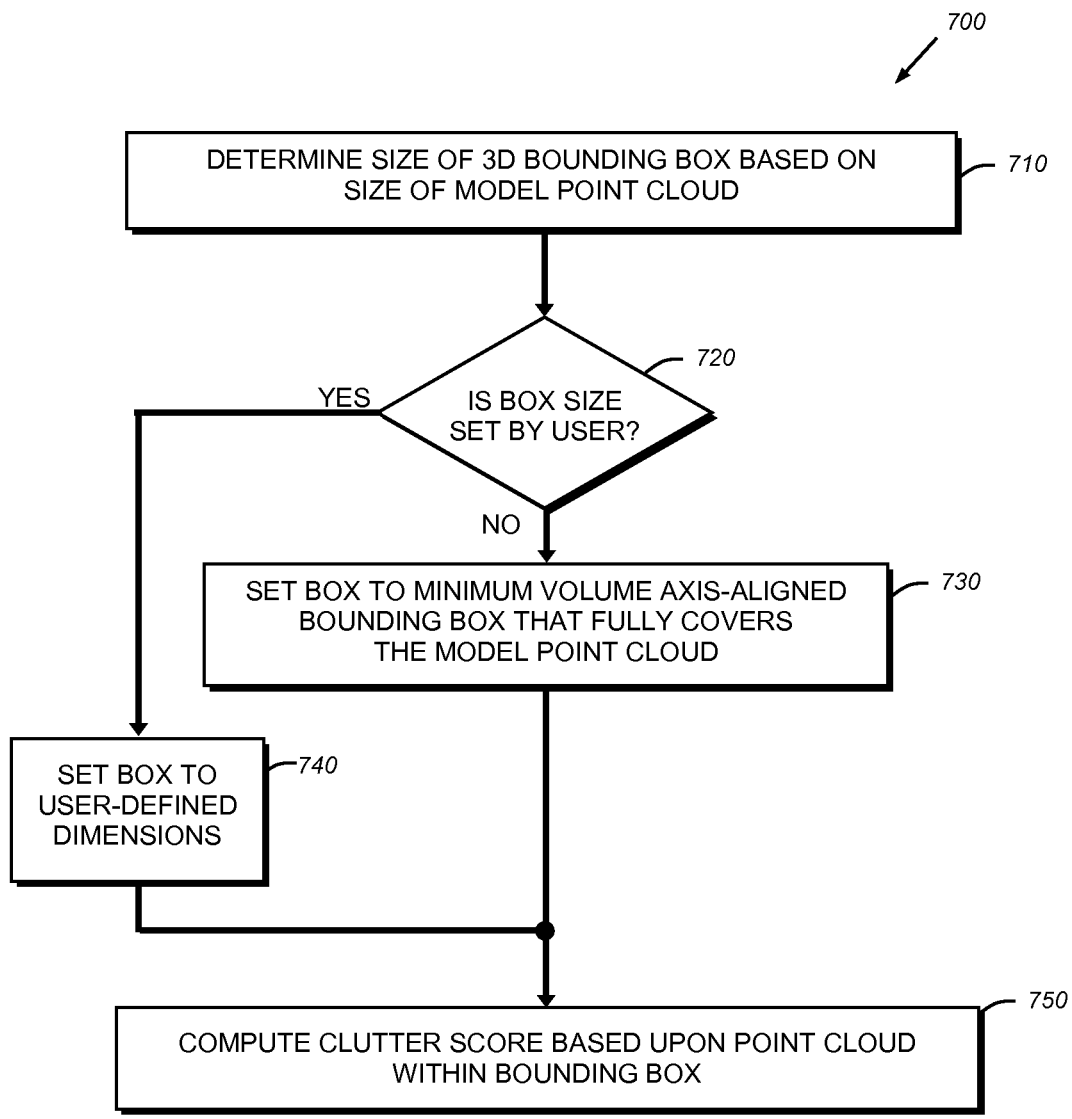
FIG. 7 is a flow diagram of a procedure for manually or automatically setting a bounding volume to compute the clutter score of a 3D point cloud image.

Wclutter←the sum of clutter weights of all run-time points in mappedBox $score_{coverage}$←$W_{cover}/N_{model}$ $score_{clutter}$←$W_{clutter}/N_{model}$ As described above, and with further reference to FIG. 7 and the process 700, the dimensions of the bounding volume used to calculate the clutter score are determined base on the size of the model point cloud (step 710). The size of the bounding volume can either be specified at train time by the user, or the user can request that the bounding box be calculated automatically (decision step 720). If set automatically, then under certain criteria, the bounding volume dimensions (size) can be set to (e.g.) the minimum-volume, bounding volume that completely contains the model point cloud (step 730). In embodiments, the bounding volume can be axis-aligned under certain criteria. If user defined, the bounding volume size is set to user-defined dimensions (step 740) based upon inputs via (e.g.) the GUI (160, 162, 164) of the vision system. Based upon the set box size the clutter score is then determined based upon the 3D point cloud of the target residing within the roughly aligned bounding volume as described above (step 750). Note that all scoring is performed on final, refined poses. In order to initially score model and target point clouds, these are roughly aligned as an initial step based upon rough features or a small set of points (e.g. corners, edges, etc.) that can be used to identify the target features relative to known features on the model.

Referring again to the process 600, once the difference between the coverage score and clutter score are determined to estimate the overall score for each possible alignment candidate (step 660), one or more alignment candidates with the highest overall score (if any) are selected in step 670. This becomes the alignment solution for that target.

In illustrative embodiments the system and method can be employed with mages containing clutter to find multiple instances of a target in an image. Where multiple instances are located, each one is scored in accordance with the steps described above and one or more instances with the best score are identified as the found target for further processing.

It should be clear that the above-described system and method provides, a relatively straightforward technique for measuring the accuracy of 3D point cloud matching results. A score between 0 and 1 provides an understandable metric in which 1 defines a perfect match between model and target point clouds, whilst a higher score indicates a better pose estimation, and a lower score defines a less desirable estimate and potentially a rejected candidate when below a given score threshold. This score can be independent to the technique used to determine matching, and thus can be used as a metric to evaluate the results from different methods based upon a similar standard. Of further note, the illustrative system and method provides the unique capability to handle clutter in point cloud images, which affords added benefits when determining certain features on an object.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate system, such as the acting direction of gravity. Accordingly, this description is meant to be taken only by way of example, and not to otherwise limit the scope of this invention.

What is claimed is:

1. A method for aligning first three-dimensional (3D) point cloud image with a second 3D point cloud image comprising the steps of:
    providing a first 3D point cloud image from a model to a vision system processor;
    providing a second 3D point cloud image from a target to a vision system processor;
    establishing a passing overall score for possible alignments of the first 3D point cloud image with the second 3D point cloud image;
    estimating a coverage score for at least one possible alignment of the first 3D point cloud image with the second 3D point cloud image so that the coverage score describes an amount of desired features in the first 3D point cloud image present in the second 3D point cloud image; and
    estimating a clutter score for at least one possible alignment of the first 3D point cloud image with the second 3D point cloud image so that the clutter score describes extraneous features in the second 3D point cloud image; and
    estimating an overall score as a difference between the coverage score and the clutter score.

2. The method as set forth in claim 1 wherein at least one of the model and the target is defined using at least one of a 3D camera and a 3D computer aided design description.

3. The method as set forth in claim 2 wherein the first 3D point cloud image is a model image.

4. The method as set forth in claim 3 wherein the second 3D point cloud image is an image of the target.

5. The method as set forth in claim 1 further comprising defining a bounding volume around the first 3D point cloud image to estimate the coverage score and to estimate the clutter score.

6. The method as set forth in claim 5 wherein a size of the bounding volume is defined automatically or based upon a user-specified definition.

7. The method as set forth in claim 6 wherein the automatically defined bounding volume is set to a minimum-volume shape that completely contains the first 3D point cloud image.

8. The method as set forth in claim 1 further comprising performing an initial registration of the first 3D point cloud image and the second 3D point cloud image based upon matching of a predetermined arrangements of points in each of the first 3D point cloud image and the second 3D point cloud image.

9. The method as set forth in claim 1 wherein each point in the first 3D point cloud image and the second 3D point cloud image defines a coverage weight.

10. The method as set forth in claim 9 wherein the coverage weight is defined between a value of 0 and a value of 1.

11. The method as set forth in claim 10 wherein the overall score is estimated based upon the clutter score multiplied by a clutter rate constant.

12. The method as set forth in claim 10 wherein each point in the first 3D point cloud image and the second 3D point cloud image defines a coverage weight and clutter weight between a value of 0 and a value of 1, and (a) wherein the coverage score is a ratio of sum of values of coverage weight to a number of points in the first 3D point cloud image and (b) the clutter score is a ratio of the sums of values of clutter weight to a number of points in the first 3D point cloud image.

13. A system for aligning a first three-dimensional (3D) point cloud image with a second 3D point cloud image comprising:
    a scoring module that determines a coverage score, a clutter score and an overall score for at least one possible alignment between the first 3D point cloud image and the second 3D point cloud image, the clutter score corresponding to an amount of extraneous features in the second 3D point cloud image, the overall score being a difference between the coverage score and the clutter score; and
    an alignment module that bases an alignment decision for the second 3D point cloud image based upon the overall score.

14. The system as set forth in claim 13 wherein a model is defined using at least one of a 3D camera and a 3D computer aided design description.

15. The system as set forth in claim 14 wherein the second 3D point cloud image is an image of a target.

16. The system as set forth in claim 13 wherein a bounding volume is defined around the first 3D point cloud image to calculate the coverage score and the clutter score.

17. The system as set forth in claim 16 wherein a size of the bounding volume is defined automatically or based upon a user-specified definition.

18. The system as set forth in claim 17 wherein the automatically defined bounding volume is set to a minimum-volume shape that completely contains the first 3D point cloud image.

19. The system as set forth in claim 13 wherein each point in the first 3D point cloud image and the second 3D point cloud image defines a coverage weight.

20. The system as set forth in claim 19 wherein the coverage weight is defined between a value of 0 and a value of 1.

21. A non-transitory computer-readable storage medium storing a set of instructions capable of being executed by a processor, that when executed by the processor causes the processor to:

provide a first three-dimensional (3D) point cloud image from a model to a vision system processor;
provide a second 3D point cloud image from a target to a vision system processor;
establish a passing overall score for possible alignments of the first 3D point cloud image with the second 3D point cloud image;
estimate a coverage score for at least one possible alignment of the first 3D point cloud image with the second 3D point cloud image so that the coverage score describes an amount of desired features in the first 3D point cloud image present in the second 3D point cloud image; and
estimate a clutter score for at least one possible alignment of the first 3D point cloud image with the second 3D point cloud image so that the clutter score describes extraneous features in the second 3D point cloud image; and
estimate an overall score as a difference between the coverage score and the clutter score.

* * * * *